(12) United States Patent
Otsuki et al.

(10) Patent No.: US 11,292,214 B2
(45) Date of Patent: Apr. 5, 2022

(54) METHOD FOR MOLDING COMPOSITE MATERIAL AND DEVICE FOR MOLDING COMPOSITE MATERIAL

(71) Applicant: NISSAN MOTOR CO., LTD., Yokohama (JP)

(72) Inventors: Akihisa Otsuki, Kanagawa (JP); Katsuhiro Usui, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/605,530

(22) PCT Filed: Apr. 19, 2018

(86) PCT No.: PCT/JP2018/016154
§ 371 (c)(1),
(2) Date: Oct. 16, 2019

(87) PCT Pub. No.: WO2018/198934
PCT Pub. Date: Nov. 1, 2018

(65) Prior Publication Data
US 2020/0070441 A1 Mar. 5, 2020

(30) Foreign Application Priority Data
Apr. 25, 2017 (JP) .............................. JP2017-086500

(51) Int. Cl.
*B29C 70/48* (2006.01)
*B29C 39/10* (2006.01)
(Continued)

(52) U.S. Cl.
CPC .............. *B29C 70/48* (2013.01); *B29C 39/10* (2013.01); *B29C 39/24* (2013.01); *B29C 39/42* (2013.01);
(Continued)

(58) Field of Classification Search
CPC ......... B29C 70/48; B29C 39/10; B29C 39/24; B29C 39/42; B29C 39/44;
(Continued)

(56) References Cited

U.S. PATENT DOCUMENTS 5,518,385 A * 5/1996 Graff ...................... B29C 70/48
425/127
6,843,953 B2 1/2005 Filsinger et al.
(Continued)

FOREIGN PATENT DOCUMENTS

CN 1380849 A 11/2002
DE 20 2012 104 148 U1 2/2014
(Continued)

OTHER PUBLICATIONS

"Nguyen, Felix N., Kenichi Yoshioka, Toshiya Kamae, Ichiro Taketa, Akihiko Kitano, "Fast-Cycle CFRP Manufacturing Technologies for Automobile Applications, 2012, Proceedings of the Twelfth U.S.-Japan Conference on Composite Materials, accessed on Dec. 2, 2020. (Year: 2012).*

*Primary Examiner* — Jacob T Minskey
*Assistant Examiner* — Caroline Beha
(74) *Attorney, Agent, or Firm* — Foley & Lardner LLP

(57) ABSTRACT

A method for molding a composite material and a device for molding a composite material are provided which are able to suppress the occurrence of voids in a composite material and improve the mechanical characteristics and appearance quality of the composite material. In the method for molding a composite material (10), a seal region (270) including a cavity (250) in which a reinforcing base material (11) is disposed and an outer peripheral region (260) that communicates with an outer periphery of the cavity is air-tightly sealed by means of a first sealing member (310). Then, an operation of suctioning a gas from the outer peripheral region to evacuate the gas in the seal region is started, and
(Continued)

a resin (12) is injected into a part of the cavity. Next, a mold (200) is clamped to provide a liquid-tight seal between the cavity and the outer peripheral region by means of a second sealing member (320) while pressing the resin to fill the cavity with the resin. After that, the operation of suctioning the gas from the outer peripheral region is stopped.

6 Claims, 11 Drawing Sheets

(51) Int. Cl.
    *B29C 39/24*      (2006.01)
    *B29C 39/42*      (2006.01)
    *B29K 63/00*      (2006.01)
    *B29C 39/44*      (2006.01)

(52) U.S. Cl.
    CPC ........ *B29C 39/44* (2013.01); *B29C 2791/006* (2013.01); *B29K 2063/00* (2013.01)

(58) Field of Classification Search
    CPC .......... B29C 2791/006; B29C 33/0038; B29C 45/0005; B29C 45/02; B29C 45/03; B29C 45/0408; B29C 45/14631; B29C 45/34; B29C 45/561; B29C 70/467; B29K 2063/00

See application file for complete search history.

(56) References Cited

U.S. PATENT DOCUMENTS

| | | | |
|---|---|---|---|
| 2004/0130072 A1* | 7/2004 | Sekido | B29C 70/48 264/408 |
| 2012/0141765 A1 | 6/2012 | Katahira et al. | |
| 2014/0061980 A1* | 3/2014 | Kobayashi | B29C 45/561 264/500 |
| 2016/0082635 A1* | 3/2016 | Kobayashi | B29C 45/0005 264/257 |

FOREIGN PATENT DOCUMENTS

| | | | | |
|---|---|---|---|---|
| DE | 10 2013 222 358 A1 | 5/2015 | | |
| DE | 10 2015 113 423 A1 | 1/2017 | | |
| EP | 0 230 709 A2 | 8/1987 | | |
| EP | 0230709 B1 * | 10/1990 | ........ | B29C 43/3607 |
| EP | 2 639 052 A1 | 9/2013 | | |
| JP | 2006-341536 A | 12/2006 | | |
| JP | 2011-000847 A | 1/2011 | | |
| JP | 5876791 B2 | 3/2016 | | |
| JP | 2016-060113 A | 4/2016 | | |

\* cited by examiner

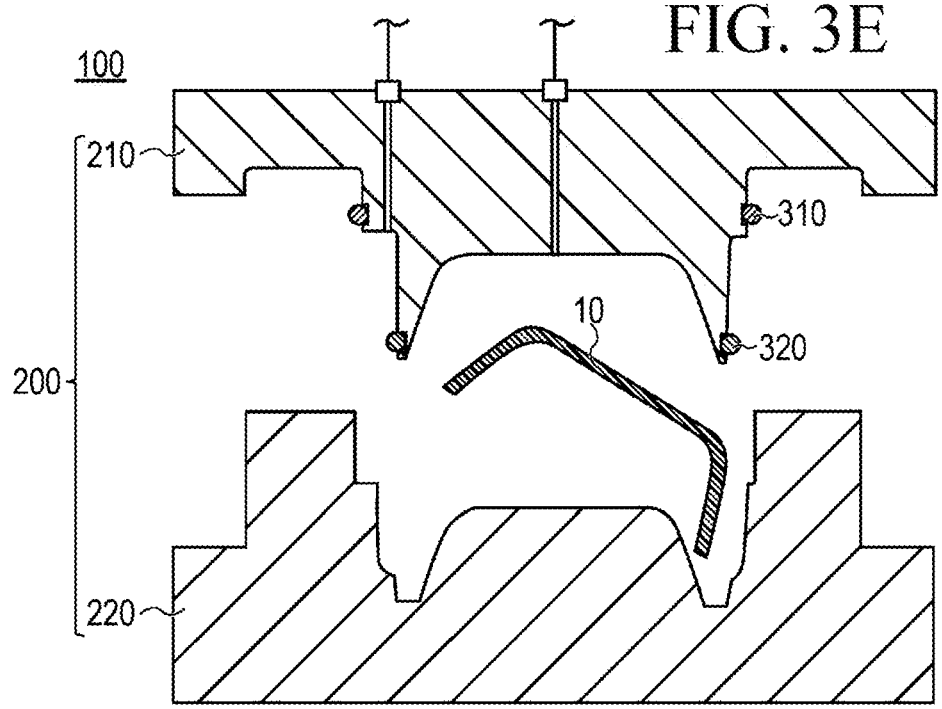

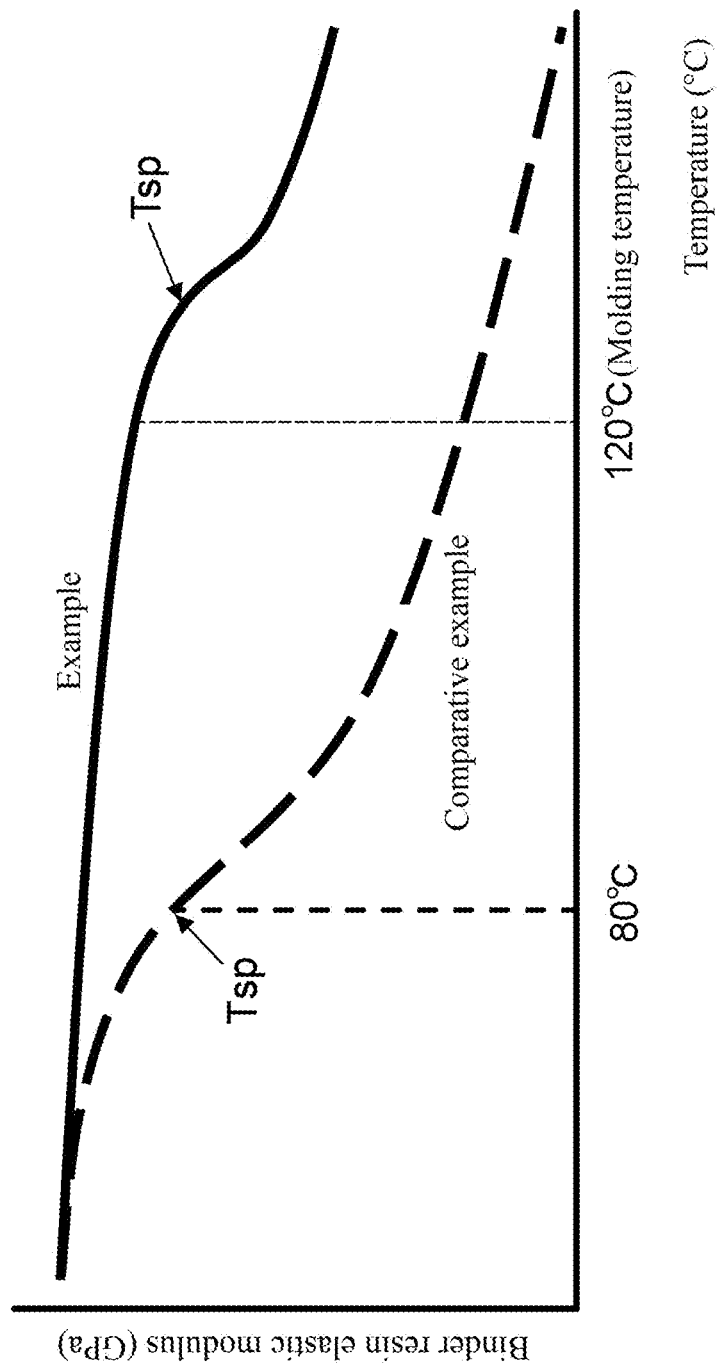

METHOD FOR MOLDING COMPOSITE MATERIAL AND DEVICE FOR MOLDING COMPOSITE MATERIAL

TECHNICAL FIELD

The present invention relates to a method for molding a composite material and a device for molding a composite material.

BACKGROUND ART

In recent years, to reduce the weight of automobile bodies, composite materials obtained by impregnating a reinforcing base material with resin are used as automobile parts. The Resin Transfer Molding (RTM) method suitable for mass production is a notable method for molding a composite material.

The RTM method includes first disposing a reinforcing base material in the cavity of a mold and evacuating the gas in the cavity through an exhaust port to put the cavity into a reduced pressure (substantially vacuum) state. Subsequent steps of the method include injecting a resin into the cavity to impregnate the reinforcing base material with the resin and curing the resin to form a composite material. Thus, the pressure in the cavity is reduced before the resin is injected into the cavity, and the reinforcing base material can thereby be readily impregnated with the resin.

In the RTM method as described above, the resin is injected into the cavity in a reduced pressure state and the injected resin may therefore flow into the exhaust port. This may reduce the suction power in evacuation and may possibly cause a portion of the reinforcing base material that is not impregnated with the resin due to an insufficient amount of the resin in the cavity.

Patent Document 1 listed below (JP5876791B), for example, discloses a method for molding a composite material using a mold provided with a double seal to prevent the injected resin from flowing into the exhaust port. The method disclosed in Patent Document 1 includes first sealing a seal region by means of a first sealing member and evacuating the gas through an exhaust port to put the seal region into a reduced pressure state. The seal region includes the cavity and an outer peripheral region that communicates with the outer periphery of the cavity. The exhaust port is provided in the outer peripheral region. Subsequent steps of the method include providing a seal between the cavity and the outer peripheral region by means of a second sealing member and injecting the resin to fill the cavity with the resin. This allows the second sealing member to block the resin injected into the cavity, and the injected resin can thus be prevented from flowing into the exhaust port.

PRIOR ART DOCUMENT

[Patent Document]
[Patent Document 1] JP5876791B

SUMMARY OF INVENTION

Problems to be Solved by Invention

In the above method for molding a composite material of Patent Document 1, however, the gas contained in the resin cannot be removed because the injection of the resin into the cavity is started after providing a seal between the cavity and the outer peripheral region. This may cause voids to be generated in the composite material, which is a molded product, and the mechanical characteristics and appearance quality of the molded product may be deteriorated.

An object of the present invention is to provide a method for molding a composite material and a device for molding a composite material that are able to suppress the occurrence of voids in a composite material and improve the mechanical characteristics and appearance quality of the composite material.

Means for Solving Problems

In the method for molding a composite material according to the present invention, which achieves the above object, a reinforcing base material is first disposed in a cavity of a mold comprising a first mold element and a second mold element. The second mold element forms the cavity together with the first mold element. Next, the first mold element is made to come relatively close to the second mold element to air-tightly seal a seal region by means of a first sealing member. The seal region includes the cavity and an outer peripheral region that communicates with an outer periphery of the cavity. Then, an operation of suctioning a gas from the outer peripheral region to evacuate the gas in the seal region is started, and a resin is injected into a part of the cavity. The first mold element is made to further come relatively close to the second mold element to clamp the mold and provide a liquid-tight seal between the cavity and the outer peripheral region by means of a second sealing member while pressing the resin to fill the cavity with the resin. After that, the operation of suctioning the gas from the outer peripheral region is stopped.

The device for molding a composite material according to the present invention, which also achieves the above object, has a mold, a first sealing member, a second sealing member, an evacuation unit, a resin injection unit, and a control unit. The mold comprises a first mold element and a second mold element that forms a cavity together with the first mold element. The first sealing member air-tightly seals a seal region between the first mold element and the second mold element. The seal region includes the cavity and an outer peripheral region that communicates with an outer periphery of the cavity. The second sealing member provides a liquid-tight seal between the cavity and the outer peripheral region. The evacuation unit suctions a gas from the outer peripheral region to evacuate the seal region. The resin injection unit injects a resin into a part of the cavity. The control unit controls actions of the mold, the evacuation unit, and the resin injection unit. The control unit operates to make the first mold element come relatively close to the second mold element to air-tightly seal the seal region by means of the first sealing member. Then, the control unit operates to control the action of the evacuation unit to start an operation of evacuating the gas in the seal region and operates to control the action of the resin injection unit to inject the resin into the cavity. The control unit operates to make the first mold element further come relatively close to the second mold element to clamp the mold and provide the liquid-tight seal between the cavity and the outer peripheral region by means of the second sealing member while pressing the resin to fill the cavity with the resin. After that, the control unit operates to stop the operation of suctioning the gas from the outer peripheral region.

Effect of Invention

According to the method for molding a composite material and device for molding a composite material of the present invention, before providing a liquid-tight seal between the cavity and the outer peripheral region, the gas is suctioned from the outer peripheral region to evacuate the gas in the cavity in a state in which the cavity and the outer peripheral region communicate with each other. Accordingly, the gas contained in the resin injected into the cavity can be evacuated from the outer peripheral region in the reduced pressure state to an exhaust port. This can suppress the occurrence of voids in the composite material, which is a molded product, and improve the mechanical characteristics and appearance quality of the composite material.

BRIEF DESCRIPTION OF DRAWINGS

FIG. 3E is a view schematically illustrating release of the molded product.

FIG. 8 is a graph illustrating the elastic modulus characteristics with respect to the temperature of binder resins used in a working example and a comparative example.

MODE(S) FOR CARRYING OUT THE INVENTION

Figure 1:
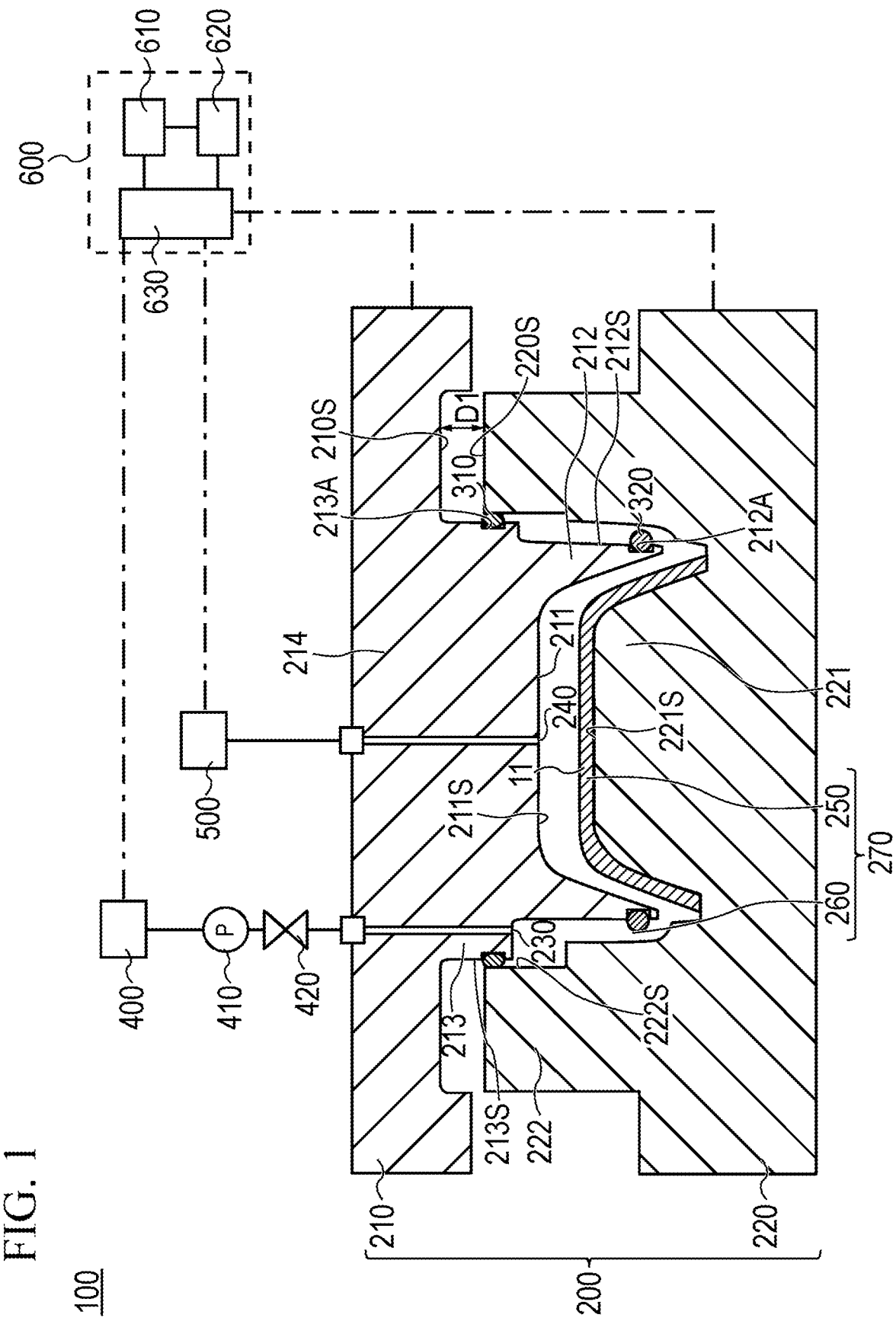
FIG. 1 is a view for describing the device for molding a composite material according to one or more embodiments of the present invention.

Hereinafter, one or more embodiments of the present invention will be described with reference to the drawings. The following description does not limit the meanings of the technical scope and terms recited in the scope of claims. The dimensional ratios in the drawings may be exaggerated for descriptive purposes and may be different from the actual ratios.

(Composite Material)

Composite material 10 is composed of a reinforcing base material 11 and a resin 12. Combination of the reinforcing base material 11 and the resin 12 allows the composite material 10 to have higher strength and rigidity than those of a molded product composed of the resin 12 alone. Examples of the composite material 10, reinforcing base material 11, and resin 12 are illustrated in FIGS. 3A to 3E and FIG. 4.

The resin 12 can be composed, for example, of a thermoset resin, such as an epoxy resin or a phenol resin, or a thermoplastic resin.

Figure 5:
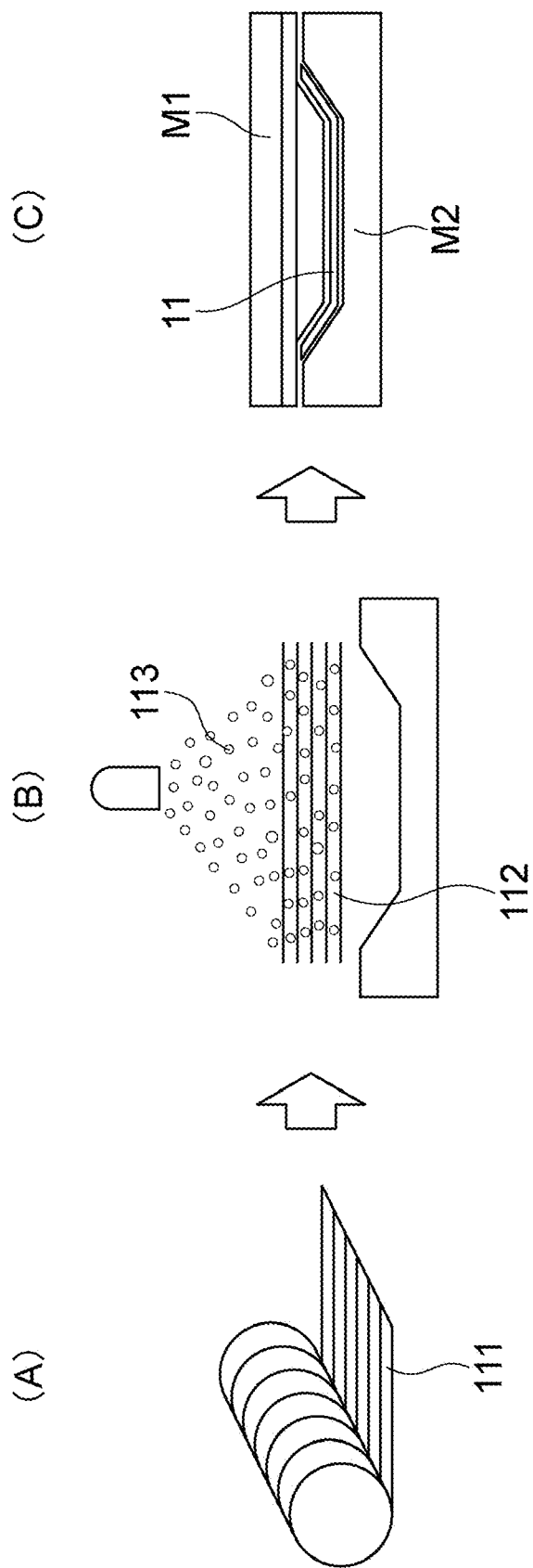
FIG. 5 is a set of views illustrating an example of a method for producing the reinforcing base material.

The reinforcing base material 11 can be configured, for example, by stacking woven fabric sheets of carbon fiber, glass fiber, organic fiber, or other similar fiber. FIG. 5 is a set of views illustrating an example of a method for producing the reinforcing base material 11. The method for producing the reinforcing base material 11 includes cutting a woven fabric sheet 111 of carbon fiber, glass fiber, organic fiber, or other similar fiber into two or more sheets having a predetermined size, as illustrated in FIG. 5 (A), and stacking the two or more woven fabric sheets 111 to obtain a fiber base material 112, as illustrated in FIG. 5(B). Subsequent steps of the method include applying a binder resin 113 to the fiber base material 112 and, as illustrated in FIG. 5(C), curing the binder resin 113 and concurrently molding the binder resin 113 into a predetermined shape using hot press molds M1 and M2. Through these steps, the fiber base material 112 is shaped together with the molded binder resin 113, and the reinforcing base material 11 in this state has a shape suitable for the setting on a lower mold element 220, which will be described later. Examples of the binder resin 113 for use include thermoset resins, such as an epoxy resin and a phenol resin, and thermoplastic resins. In particular, it is preferred to use a material having a softening point Tsp equal to or higher than a molding temperature for the resin 12, which will be described later. Specifically, the softening point Tsp is preferably equal to or higher than the set temperature of an upper mold element 210 or the lower mold element 220. Such a material is not particularly limited, and a thermoset epoxy resin and other similar resins can be exemplified.

(Molding Device)

A molding device 100 for the composite material 10 according to one or more embodiments of the present invention will be described with reference to FIG. 1.

The molding device 100 includes an openable and closable mold 200, a first sealing member 310 and a second sealing member 320, an evacuation unit 400, a resin injection unit 500, and a control unit 600.

The configuration of each part of the molding device 100 will be described in detail below.

The mold 200 includes a pair of an upper mold element 210 (corresponding to the "first mold element") and a lower mold element 220 (corresponding to the "second mold element") that are able to come close to each other and separate away from each other. The upper mold element 210 is provided with an exhaust port 230 that communicates with the evacuation unit 400 and an injection port 240 that communicates with the resin injection unit 500. The mold 200 forms a cavity 250 between the upper mold element 210 and the lower mold element 220.

In the present description, the "cavity 250" means a cavity (so-called product cavity) having substantially the same shape as that of the composite material 10, which is a molded product, in the mold clamping state. The side (upper side in FIG. 1) on which the upper mold element 210 is disposed above the lower mold element 220 is referred to as an "upper side", and the side (lower side in FIG. 1) on which the lower mold element 220 is disposed below the upper mold element 210 is referred to as a "lower side."

The upper mold element 210 is a movable element that can come close to and separate from the lower mold element 220. The upper mold element 210 includes a concave part 211 having a shape recessed toward the upper side, a first vertical wall part 212 having a shape protruding toward the lower side so as to surround the concave part 211, a base part 213 formed continuously on the upper side of the concave part 211 and the first vertical wall part 212, and a lid part 214 disposed on the upper side of the base part 213. The lid part 214 of the upper mold element 210 is connected, for example, to a drive device (not illustrated) provided with a hydraulic cylinder or the like.

The concave part 211 is formed with a first molding surface 211S that forms the cavity 250.

The base part 213 has an outer surface 213S formed with a first annular groove part 213A over the entire circumference. The first sealing member 310 having a similar annular shape is fitted in the first annular groove part 213A.

The first vertical wall part 212 has an outer surface 212S formed with a second annular groove part 212A over the entire circumference. The second sealing member 320 having a similar annular shape is fitted in the second annular groove part 212A.

The lower mold element 220 is a fixed element. The lower mold element 220 has a convex part 221 and a second vertical wall part 222. The convex part 221 is formed with a second molding surface 221S that cooperates with the first molding surface 211S of the concave part 211 to form the cavity 250 between the convex part 221 and the concave part 211. The second vertical wall part is disposed so as to surround the convex part 221 and the first vertical wall part 212.

The second vertical wall part has an inner surface 222S formed so as to face the outer surface 212S of the first vertical wall part 212 in a state in which, as illustrated in FIG. 1, the upper mold element 210 is brought relatively close to the lower mold element 220.

The first sealing member 310 and the second sealing member 320 are disposed respectively on the outer surface 212S of the first vertical wall part 212 and the outer surface 213S of the base part 213 among surfaces at which the upper mold element 210 and the lower mold element 220 face each other. The outer surface 212S and the outer surface 213S are surfaces along the clamping direction (vertical direction in FIG. 1) in which the upper mold element 210 and the lower mold element 220 come relatively close to each other. Thus, the mold 200 has a vertically slidable structure in which the first sealing member 310 and the second sealing member 320 are arranged at different positions in the mold clamping direction. The first sealing member 310 and the second sealing member 320 can therefore exert respective sealing functions at different timings as the upper mold element 210 is operated to come relatively close to the lower mold element 220.

Figure 3A:
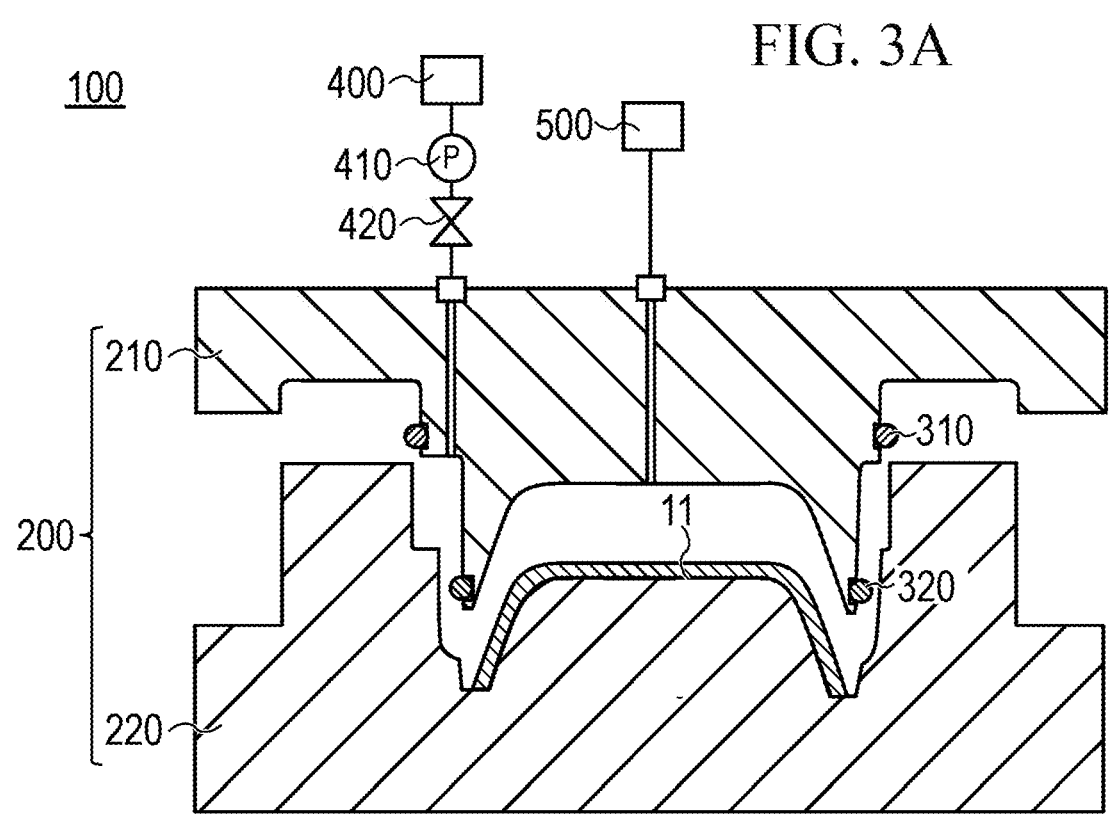
FIG. 3A is a view schematically illustrating a state in which the reinforcing base material is disposed in the mold.
Figure 3B:
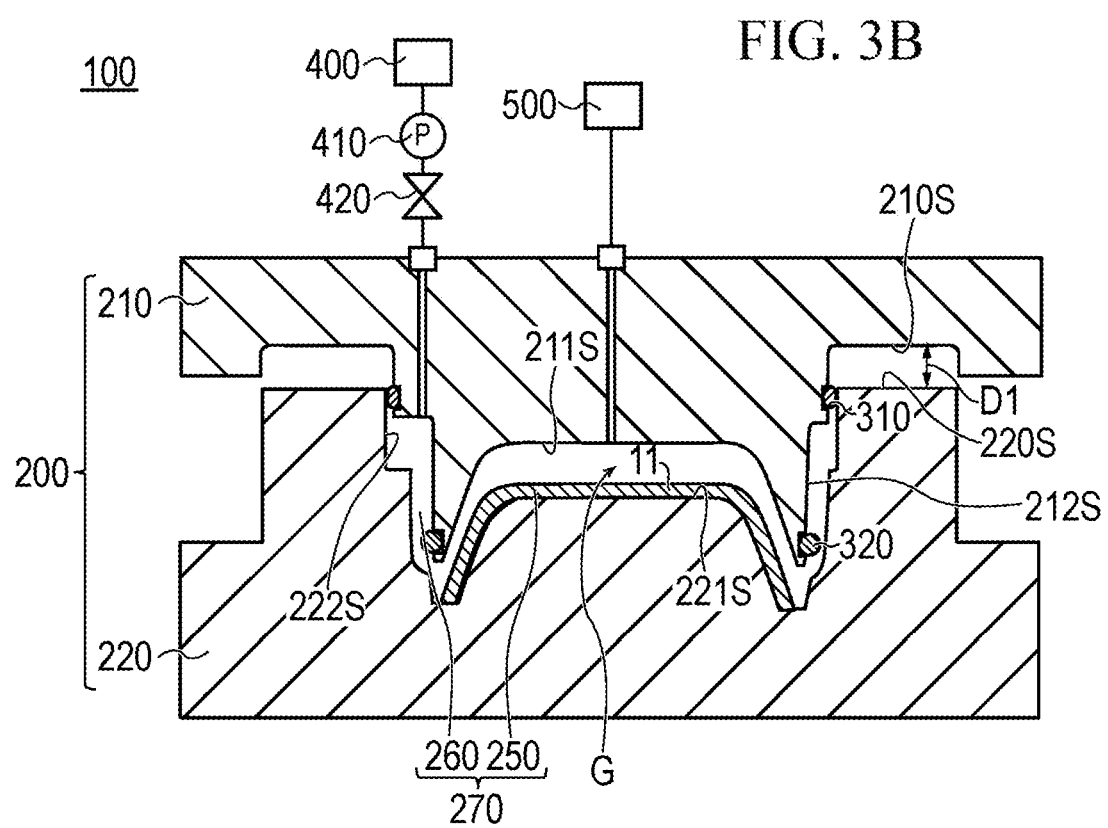
FIG. 3B is a view schematically illustrating a state in which the seal region is air-tightly sealed.

As illustrated in FIG. 1 and FIG. 3B, in a state before mold clamping in which the upper mold element 210 is brought relatively close to the lower mold element 220 from the mold open state illustrated in FIG. 3A, the first sealing member 310 forms a seal region 270 that is air-tightly sealed, together with the first molding surface 211S, the second molding surface 221S, the outer surface 212S of the first vertical wall part 212, and the inner surface 222S of the second vertical wall part 222. Here, the seal region 270 is a region including the cavity 250 and an outer peripheral region 260, which will be described later. In the state before mold clamping as illustrated in FIG. 1 and FIG. 3B, the cavity 250 and the outer peripheral region 260 communicate with each other.

Figure 3C:
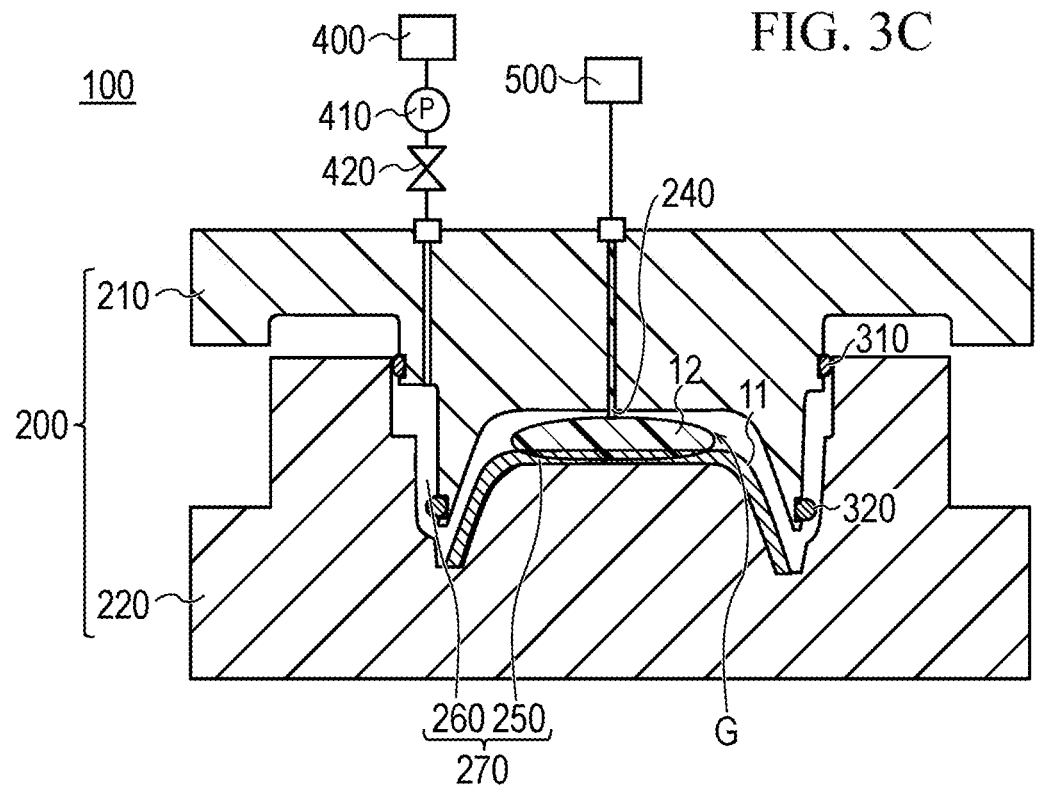
FIG. 3C is a view schematically illustrating the injection of resin into the mold.
Figure 3D:
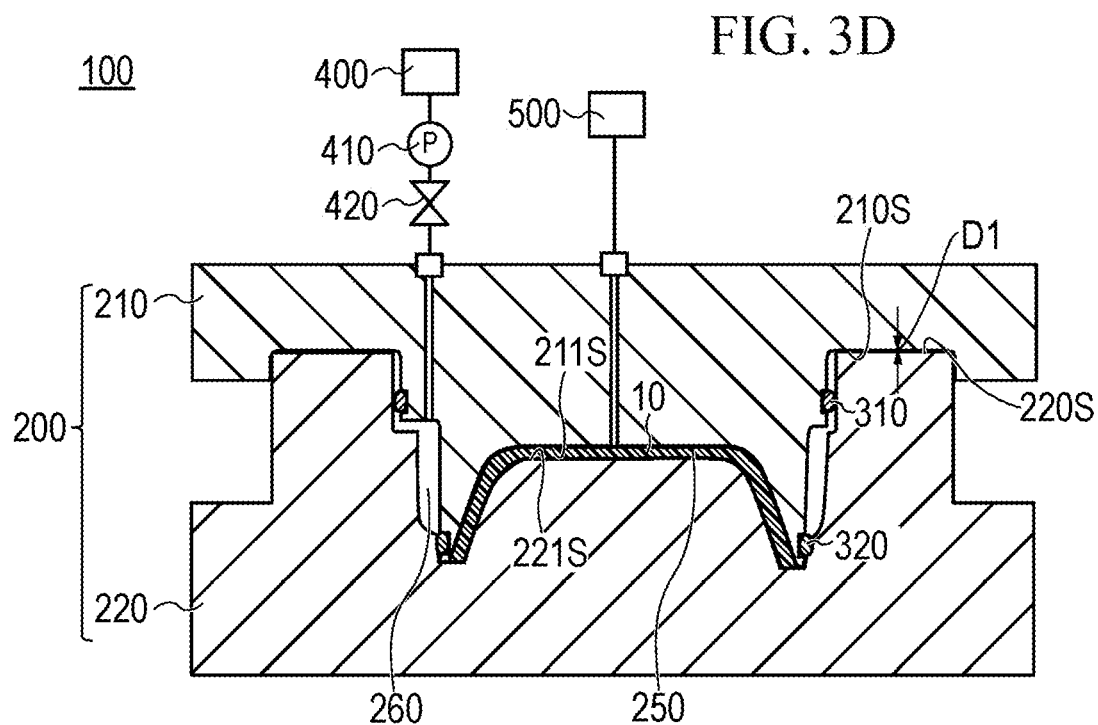
FIG. 3D is a view schematically illustrating a state in which the mold is clamped after the resin injection.

As illustrated in FIG. 3D, in a state in which the upper mold element 210 is further brought relatively close to the lower mold element 220 from the state illustrated in FIG. 3B and the mold 200 is thus clamped, the second sealing member 320 forms the cavity 250 which is now liquid-tightly sealed between the first molding surface 211S and the second molding surface 221S. In addition, in the state in which the mold 200 is clamped, the outer peripheral region 260 located around the cavity 250 is formed between the first sealing member 310 and the second sealing member 320. In other words, the second sealing member 320 provides a liquid-tight seal between the cavity 250 and the outer peripheral region 260.

In the present description, the "state in which the mold 200 is clamped" means a state in which the upper mold element 210 is brought relatively close to the lower mold element 220 until the shape of the cavity 250 of the mold 200 becomes substantially the same as the shape of the composite material 10 to be finally produced.

In one or more embodiments of the present invention, in the state in which the mold 200 is clamped as illustrated in FIG. 3D, the upper mold element 210 and the lower mold element 220 have a first contact surface 210S and a second contact surface 220S, respectively, that are in contact with each other. In the state in which the mold 200 is clamped, the distance D1 between the first contact surface 210S and the second contact surface 220S is 0 (zero) mm. In this state, the size of the cavity 250 is substantially the same as that of the composite material 10, and almost no gap exists between the first molding surface 211S of the upper mold element 210 and the composite material 10.

On the other hand, in a state in which the mold 200 has not been clamped as illustrated in FIG. 3B, a gap G is formed between the first molding surface 211S of the upper mold element 210 and the reinforcing base material 11. In this state, the distance D1 between the first contact surface 210S and the second contact surface 220S can be about 33 mm, for example, which may vary depending on the shape of the mold 200 and other factors.

Referring again to FIG. 1, the exhaust port 230 is provided on the upper side of the outer peripheral region 260. In the state in which the mold 200 is clamped, the volume of the outer peripheral region 260 is larger than the volume of the resin 12 to be injected into the cavity 250.

The injection port 240 is provided substantially at the center of the cavity 250. That is, the injection port 240 is provided at a position relatively distant from the outer peripheral region 260.

The material which constitutes the first sealing member 310 and the second sealing member 320 is not particularly limited, provided that the material can provide an air-tight seal or a liquid-tight seal. For example, an elastic material such as rubber can be used.

The evacuation unit 400 is configured using a known vacuum pump. The evacuation unit 400 is configured to communicate with the exhaust port 230 formed in the upper mold element 210 and suctions the gas from the outer peripheral region 260 through the exhaust port 230. The evacuation unit 400 has a pressure gauge 410 and a valve 420 between the evacuation unit 400 and the exhaust port 230. The pressure gauge 410 measures the suction pressure generated by the evacuation unit 400. The degree of vacuum in the seal region 270 can be adjusted on the basis of the value of the suction pressure. The valve 420 opens and closes the air flow path. This can switch the ON/OFF of the suction operation of the evacuation unit 400.

The resin injection unit 500 is configured to communicate with the injection port 240 formed in the upper mold element 210 and injects the resin 12 into the cavity 250 through the injection port 240. The resin injection unit 500 can be configured using a known pump mechanism.

The control unit 600 controls actions of the mold 200, the evacuation unit 400, and the resin injection unit 500. Specifically, referring to FIG. 1, the control unit 600 includes a storage unit 610 configured using a ROM and a RAM, a calculation unit 620 mainly configured using a CPU, and an input/output unit 630 that performs transmission and reception of various data and control commands. The input/output unit 630 is electrically connected to the mold 200, the evacuation unit 400, and the resin injection unit 500.

(Molding Method)

The molding method for the composite material 10 according to one or more embodiments of the present invention will then be described with reference to FIG. 2.

The molding method for the composite material 10 according to one or more embodiments of the present invention is a method referred to as the so-called Compression Resin Transfer Molding (CRTM) method. In the CRTM method, when the resin 12 is injected into the cavity 250, the mold 200 is not clamped and the resin 12 is injected into a part of the cavity 250 in a state in which a gap is formed between the mold 200 and the reinforcing base material 11. After that, the mold 12 is clamped to fill the cavity 12 with the resin 12. This can reduce the flow resistance of the resin 12 in the cavity 250, and disordered orientation in the reinforcing base material 11 can therefore be suppressed.

The molding method for the composite material 10 will be outlined below with reference to FIG. 2. The reinforcing base material 11 is disposed in the mold 200 (step S1) and the seal region 270 is air-tightly sealed (step S2). Then, after an operation of evacuating the gas in the seal region 270 is started (step S3) and the inside of the seal region 270 reaches a predetermined degree of vacuum (threshold value) (step S4), the resin 12 is injected into the cavity 250 of the mold 200 (step S5). Then, the mold 200 is clamped to liquid-tightly seal the cavity 250 (step S6). After that, the resin 12 is cured (step S7), the operation of evacuating the gas is stopped (step S8), and the composite material 10 is released from the mold 200 (step S9). In each step, the actions of the mold 200, the evacuation unit 400, and the resin injection unit 500 are controlled by the control unit 600.

Each step of the molding method for the composite material 10 will be described in detail below.

In step S1, as illustrated in FIG. 3A, the reinforcing base material 11 is disposed on the lower mold element 220 of the mold 200.

In step S2, as illustrated in FIG. 3B, the upper mold element 210 is brought relatively close to the lower mold element 220, and the seal region 270 is air-tightly sealed by means of the first sealing member 310. At this time, the mold 200 is in a state before being clamped, and the distance D1 between the first contact surface 210S and the second contact surface 220S is about 33 mm. In this state, the gap G is formed between the first molding surface 211S of the upper mold element 210 and the reinforcing base material 11.

In step S3, the valve 420 of the evacuation unit 400 is opened to start the operation of suctioning the gas from the outer peripheral region 260 to evacuate the gas in the seal region 270.

After the inside of the seal region 270 reaches a predetermined degree of vacuum (step S4), as illustrated in FIG. 3C, the resin 12 is injected into a part of the cavity 250 of the mold 200 (step S5).

The resin 12 is injected into a part of the cavity 250 and it is therefore possible to suppress leakage of the resin 12 in the cavity 250 into the outer peripheral region 260 even though the cavity 250 and the outer peripheral region 260 communicate with each other. This can prevent the resin 12 from flowing into the exhaust port 230.

In one or more embodiments of the present invention, the resin 12 flows through the gap G because the injection port 240 is provided in the upper mold element 210. This can reduce the flow resistance of the resin 12 to suppress the disordered orientation in the reinforcing base material 11. Moreover, even though the gap G is formed, the injected resin 12 stays in the vicinity of the injection port 240 without spreading through the entire cavity 250. This can suppress the leakage of the resin 12 into the outer peripheral region 260.

Figure 4:
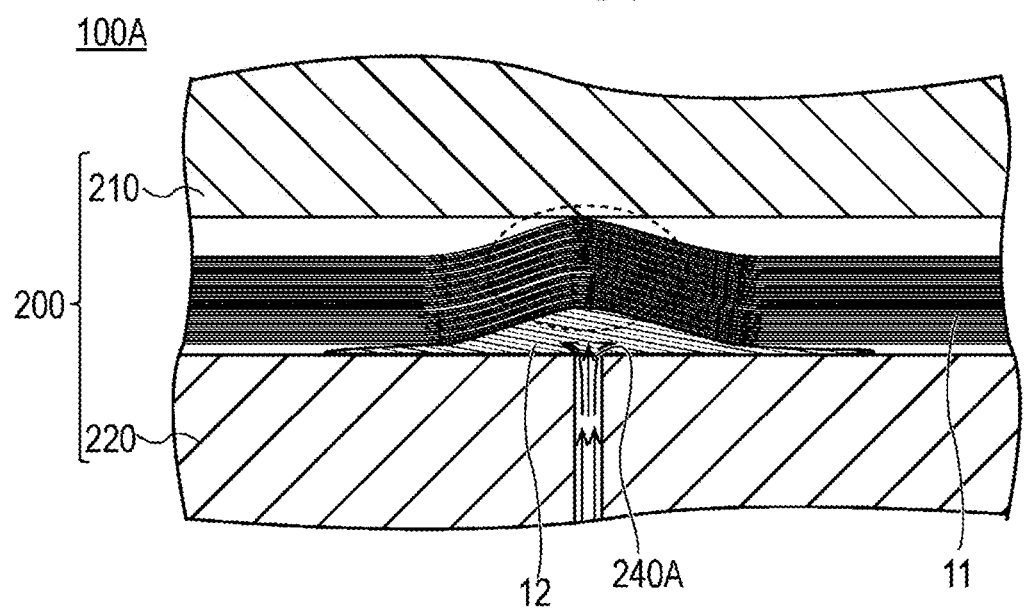
FIG. 4 is a view schematically illustrating a comparative example in which the resin is injected through an injection port provided in the lower mold element.

If, hypothetically, the injection port 240A is provided in the lower mold element 220 as in a molding device 100A illustrated in FIG. 4, the reinforcing base material 11 is disposed on the lower side due to its own weight, and it is therefore difficult to provide a gap between the second molding surface 221S of the lower mold element 220 and the reinforcing base material 11.

As a result, the flow resistance of the resin 12 is increased, and the disordered orientation (portion surrounded by a broken line in FIG. 4) may possibly occur in the reinforcing base material 11. This will impair the appearance quality of the composite material 10 which is a molded product.

It is otherwise conceivable that the reinforcing base material 11 disposed in the vicinity of the injection port 240 is preliminarily removed to reduce the flow resistance of the resin 12, but depending on the shape of the molded product, the position at which the injection port 240 is provided is limited because the position of the injection port 240 may have to be determined in accordance with the position at which the reinforcing base material 11 is removed.

On the other hand, the gap G can be formed by providing the injection port 240 in the upper mold element 210 as in one or more embodiments of the present invention. The flow resistance of the resin 12 can be reduced by making the resin 12 flow into the gap G. This can suppress the disordered orientation in the reinforcing base material 11 and thus improve the appearance quality of the composite material 10 which is a molded product.

Moreover, it is not necessary to preliminarily remove the reinforcing base material 11 disposed in the vicinity of the injection port 240. Accordingly, the position at which the injection port 240 is provided is not limited depending on the shape of the molded product, and an optimal position of the injection port 240 can therefore be set for impregnating the reinforcing base material 11 with the resin 12. As a result, the injection time for the resin 12 can be shortened to reduce the overall cycle time.

Furthermore, the injection port 240 is provided substantially at the center of the cavity 250 and, therefore, the distance from the outer peripheral region 260 is relatively long. This can prevent the resin 12 from flowing into the outer peripheral region 260.

In addition, in step S5, the evacuation unit 400 maintains the operation of evacuating the gas in the seal region 270. The exhaust port 230 is provided on the upper side of the outer peripheral region 260 and it is therefore possible to prevent the resin 12 injected into the cavity 250 from flowing into the exhaust port 230.

In step S6, as illustrated in FIG. 3D, the mold 200 is clamped and the second sealing member 320 provides a liquid-tight seal between the cavity 250 and the outer peripheral region 260.

Clamping the mold 200 allows the gap G to be compressed between the first molding surface 211S of the upper mold element 210 and the reinforcing base material 11, and the resin 12 staying in the gap G is pressed to impregnate the entire reinforcing base material 11. At the same time, the periphery of the cavity 250 is liquid-tightly sealed and, therefore, leakage of the resin 12 from the cavity 250 to the outer peripheral region 260 can be more reliably prevented.

Moreover, the mold 200 has the concave part 211 in the upper mold element 210 and the convex part 221 in the lower mold element 220 and the concave part 211 forms the cavity 250 together with the concave part 211; therefore, the resin 12 can readily spread through and impregnate the entire reinforcing base material 11 by taking advantage of the own weight of the resin 12.

Furthermore, the exhaust port 230 is provided on the upper side of the outer peripheral region 260. In addition, in the state in which the mold 200 is clamped, the volume of the outer peripheral region 260 is larger than the volume of the resin 12 to be injected into the cavity 250. Accordingly, even if the resin 12 leaks into the outer peripheral region 260 after the mold 200 is clamped, the resin 12 can be prevented from flowing into the exhaust port 230.

In step S7, the resin 12 is cured. When the resin 12 is a thermoset resin, the resin 12 can be cured by heating the mold 200, for example, using a heating device such as a heater.

In step S8, the valve 420 of the evacuation unit 400 is closed to stop the operation of suctioning (evacuating) the gas from the outer peripheral region 260. That is, during steps 3 to 7, the evacuation unit 400 maintains the operation of evacuating the gas. In step 6, before the liquid-tight seal is provided between the cavity 250 and the outer peripheral region 260, the gas is suctioned from the outer peripheral region 260 to evacuate the gas in the cavity 250 in a state in which the cavity 250 and the outer peripheral region 260 communicate with each other. Accordingly, the gas contained in the resin 12 injected into the cavity 250 can be evacuated from the outer peripheral region 260 in the reduced pressure state to the exhaust port 230. This can suppress the occurrence of voids in the composite material 10, which is a molded product, and can improve the mechanical strength and the appearance quality.

In step S9, as illustrated in FIG. 3E, the upper mold element 210 is moved away from the lower mold element 220 to open the mold 200, and the composite material 10 which is a molded product is released.

In one or more embodiments of the present invention, the composite material 10 has a relatively simple shape, but is not limited to this. For example, when the composite material 10 is produced as a frame component, such as a pillar or a front side member used for the car body of an automobile, or an outer panel component, such as a roof or a hood, the composite material 10 may have a more complicated shape corresponding to such a component.

Figure 6:
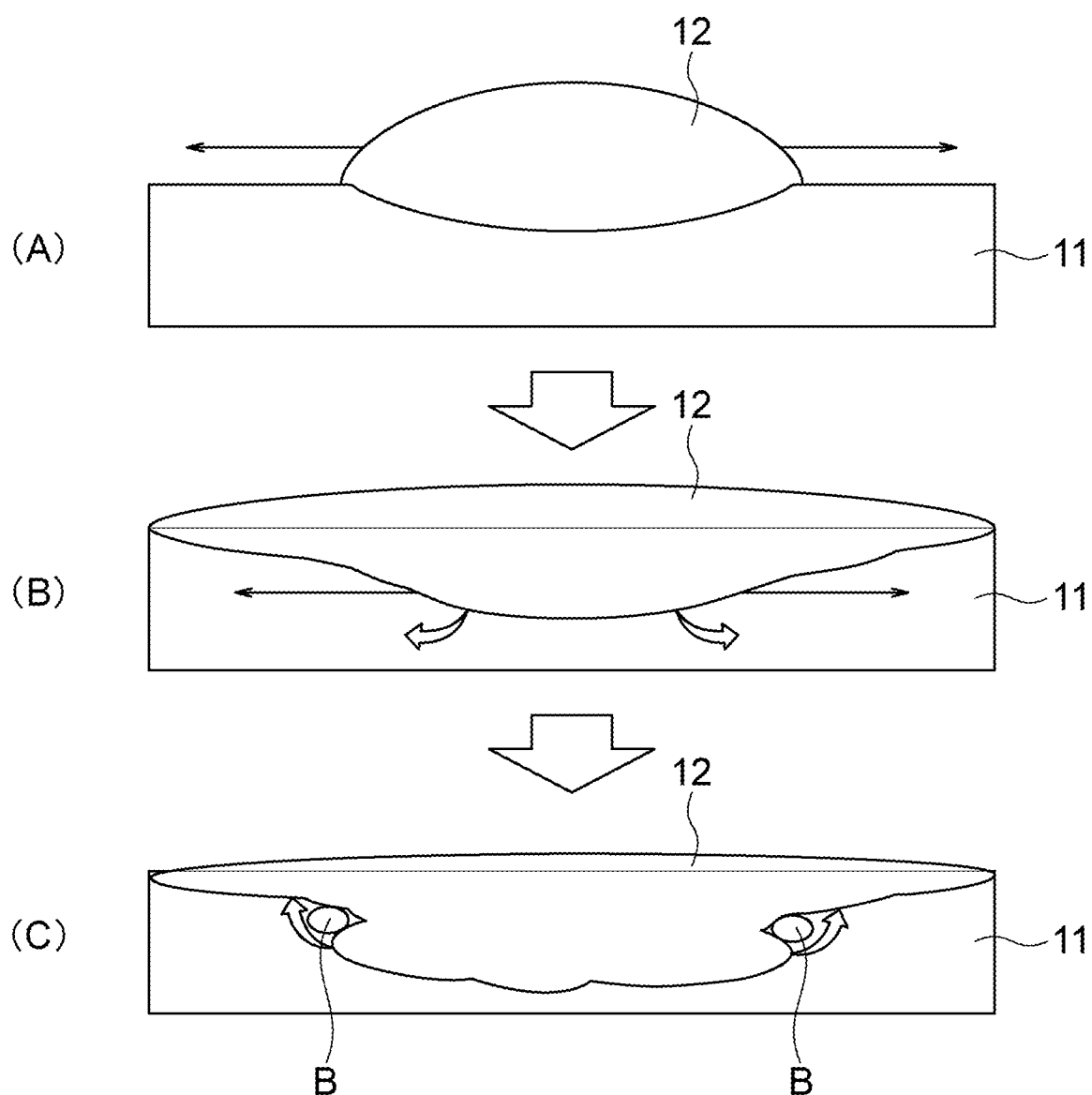
FIG. 6 is a set of enlarged cross-sectional views illustrating the behavior of the resin relative to the reinforcing base material in step S5 (FIG. 3C).
Figure 7:
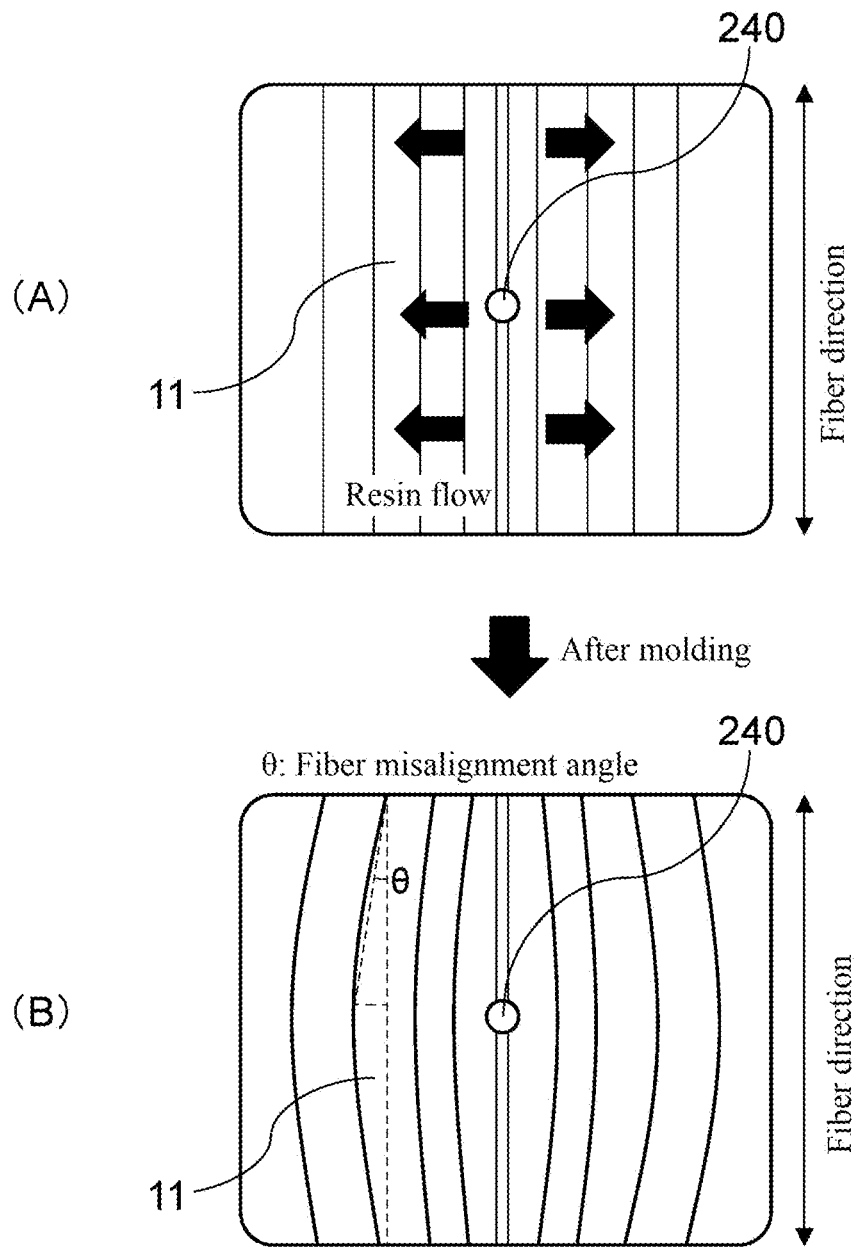
FIG. 7 is a set of enlarged plan views illustrating the behavior of the resin relative to the reinforcing base material in step S5 (FIG. 3C).

In the above-described step S5, when the inside of the seal region 270 reaches a predetermined degree of vacuum, the resin 12 is injected into a part of the cavity 250 of the mold 200 as illustrated in FIG. 3C. FIG. 6 is a set of enlarged cross-sectional views illustrating the behavior of the resin 12 relative to the reinforcing base material 11 in step S5 (FIG. 3C), and FIG. 7 is a set of enlarged plan views of the same. First, when the resin 12 is injected into a part of the cavity 250 of the mold 200 as illustrated in FIG. 6(A) and FIG. 7(A), the injection pressure for the resin is high. So, if the shape-retaining ability of the fiber base material 112 of the reinforcing base material 11 is poor, then, as illustrated in FIG. 6(B) and FIG. 7(A), the fibers of the fiber base material 112 of the reinforcing base material 11 may be spread and misaligned in both directions as indicated by the arrows when the resin 12 impregnates the reinforcing base material 11 in the vicinity of a site facing the injection port 240. As a result, as illustrated in FIG. 7 (B), when the fibers of the fiber base material 112 are spread and misaligned in a direction perpendicular to the direction of the fibers and a fiber misalignment angle θ occurs, the tensile strength of the composite material 10 to be a final product is deteriorated. In addition, if the flow resistance of the resin 12 increases as the fibers of the fiber base material 112 are misaligned, that is, if the resin 12 becomes difficult to flow due to the misalignment of the fibers, then, as illustrated in FIG. 6(C), voids B may be caused inside the composite material 10, and the compressive strength of the composite material 10 to be a final product will be deteriorated.

Such a behavior is also called a fingering phenomenon, and one of the causes is considered to be the heat resistance of the reinforcing base material 11. This will be more specifically described. In step S5, the reinforcing base material 11 is set in the lower mold element 220 which is set to the molding temperature. If the softening temperature Tsp of the binder resin 113 for retaining the shape of the reinforcing base material 11 is lower than the molding temperature, specifically, lower than the temperature of the lower mold element 220, then the reinforcing base material 11 will be softened to deteriorate the shape retaining ability of the fiber base material 112 when the resin 12 is injected in step S5.

In this context, the present inventors compared a working example with a comparative example. The working example was prepared using carbon fibers (Zoltec PX35 available from Toray Industries, Inc.) as the woven fabric sheets 111. The woven fabric sheets 111 were stacked to obtain the fiber base material 112 such that the fiber directions were aligned in the same direction (i.e., UD 0°). The fiber base material 112 was coated with a thermoset epoxy resin as the binder resin 113 having a softening temperature Tsp of 130° C. at a coating amount of 15 g/m$^2$, and the binder resin 113 was thermally cured at 140° C. for 1 to 2 minutes to obtain a test piece. The comparative example was prepared as another test piece under the same conditions as those for the working example except that a thermoplastic epoxy resin having a softening temperature of 80° C. was used.

Figure 2:
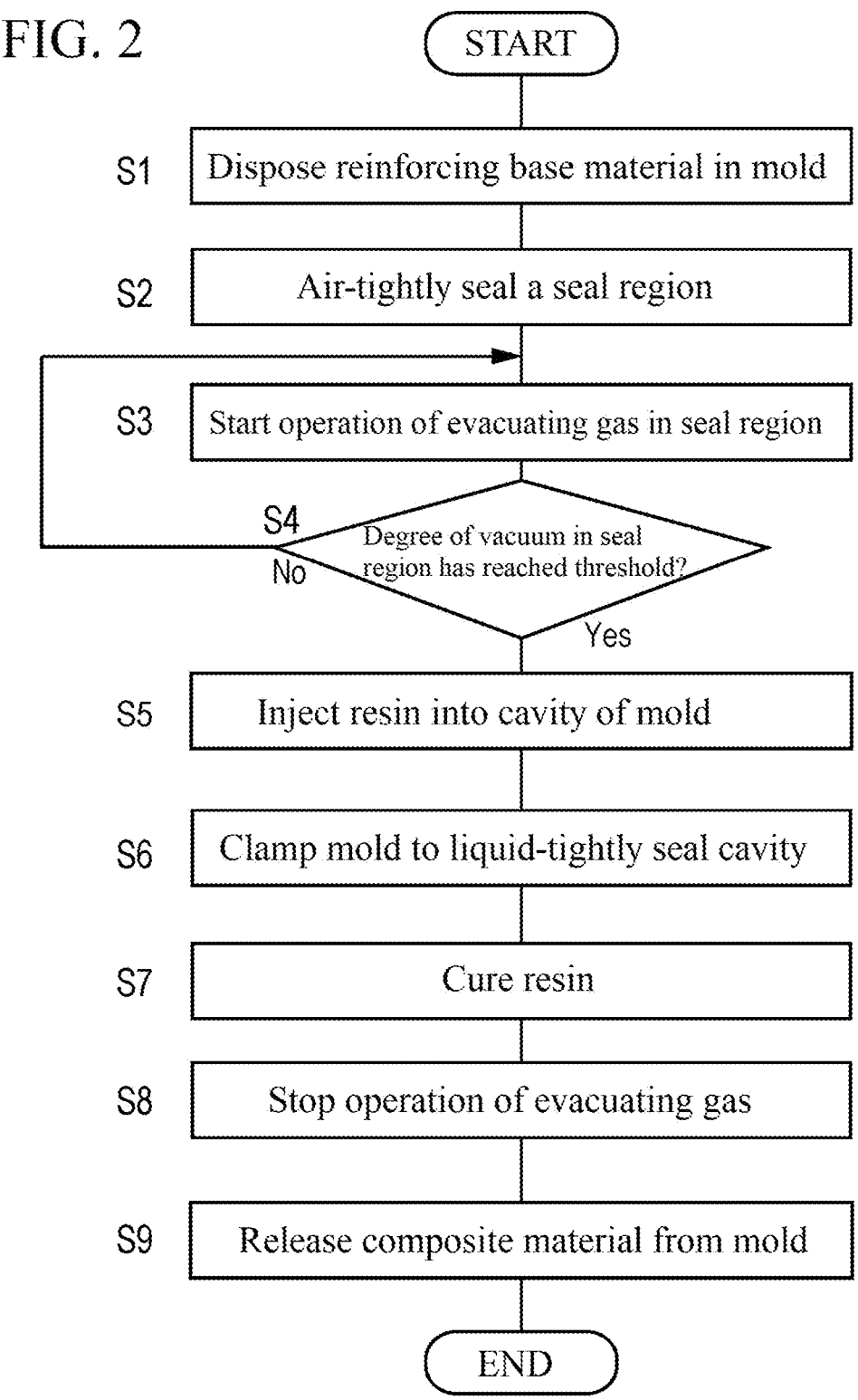
FIG. 2 is a flowchart illustrating the method for molding a composite material according to one or more embodiments of the present invention.

For these test pieces of the working example and comparative example, steps S1 to S9 of FIG. 2 were carried out under the conditions of a molding temperature of 120° C. and a molding pressure of 8 MPa. The fiber misalignment angle θ (FIG. 7B), void ratio (vol %), tensile strength deterioration ratio (%), and compressive strength deterioration ratio (%) of each test piece of the obtained composite material 10 were measured. The results are listed in Table 1. The tensile strength deterioration ratio of the comparative example is a deterioration ratio with respect to the tensile strength of the working example, and the compressive strength deterioration ratio of the comparative example is a deterioration ratio with respect to the compressive strength of the working example. FIG. 8 is a graph illustrating the elastic modulus characteristics with respect to the temperature of the binder resins 113 used in the working example and comparative example. It can be understood that, in the binder resin 113 used in the working example, the elastic modulus is less likely to deteriorate up to the softening point Tsp=130° C. which exceeds the molding temperature of 120° C., whereas in the hinder resin 113 used in the comparative example, deterioration of the elastic modulus starts from the softening point Tsp=80° C. which is lower than the molding temperature of 120° C., and the elastic modulus at the molding temperature of 120° C. is significantly lower than the elastic modulus of the working example.

TABLE 1

| | Binder resin softening point | Fiber misalignment angle θ | Void ratio | Tensile strength deterioration ratio | Compressive strength deterioration ratio |
|---|---|---|---|---|---|
| Working example | 130° C. | 1.0° | 1% or less | — | — |
| Comparative example | 80° C. | 4.0° | 5% or more | −20% | −25% |

As listed above, it has been confirmed that the tensile strength deteriorates as the fiber misalignment increases and the compressive strength deteriorates as the void ratio increases. At the same time, it has also been confirmed that the deterioration of the tensile strength and compressive strength is suppressed by using a material having a resin softening point equal to or higher than the temperature of the lower mold element 220 as the binder resin 113 of the reinforcing base material 11.

As described above, in the method for molding the composite material 10 and the molding device 100 for the composite material 10 according to one or more embodiments of the present invention, the reinforcing base material 11 is first disposed in the mold 200 comprising the upper mold element 210 (corresponding to the "first mold element") and the lower mold element 220 (corresponding to the "second mold element"). The lower mold element 220 forms the cavity 250 together with the upper mold element 210. Next, the upper mold element 210 is made to come relatively close to the lower mold element 220 to air-tightly seal the seal region 270 by means of the first sealing member 310. The seal region 270 includes the cavity 250 and the outer peripheral region 260 that communicates with the outer periphery of the cavity 250. Then, the operation of suctioning the gas from the outer peripheral region 260 to evacuate the gas in the seal region 270 is started, and the resin 12 is injected into a part of the cavity 250. The upper mold element 210 is made to further come relatively close to the lower mold element 220 to clamp the mold 200 and provide a liquid-tight seal between the cavity 250 and the outer peripheral region 260 by means of the second sealing member 320 while pressing the resin 12 to fill the cavity 250 with the resin 12. After that, the operation of suctioning the gas from the outer peripheral region 260 is stopped.

According to the method for molding the composite material 10 having such features, before providing the liquid-tight seal between the cavity 250 and the outer peripheral region 260, the gas is suctioned from the outer peripheral region 260 to evacuate the gas in the cavity 250 in a state in which the cavity 250 and the outer peripheral region 260 communicate with each other. Accordingly, the gas contained in the resin 12 injected into the cavity 250 can be evacuated from the outer peripheral region 260 in the reduced pressure state to the exhaust port 230. This can suppress the occurrence of voids in the composite material 10, which is a molded product, and improve the mechanical characteristics and appearance quality of the composite material 10.

In one or more embodiments of the present invention, the first sealing member 310 and the second sealing member 320 are disposed on the surfaces 212S and 213S among surfaces at which the upper mold element 210 and the lower mold element 220 face each other. The surfaces 212S and 213S are those along the clamping direction in which the upper mold element 210 and the lower mold element 220 come relatively close to each other. The first sealing member 310 and the second sealing member 320 can therefore exert respective sealing functions as the upper mold element 210 is operated to come relatively close to the lower mold element 220. The gap G can be formed between the mold 200 and the reinforcing base material 11 by adjusting the arrangement of the first sealing member 310 and second sealing member 320. The resin 12 can flow through the gap G thereby to reduce the flow resistance of the resin 12 in the cavity 250 and suppress the disordered orientation in the reinforcing base material 11. This can further improve the mechanical characteristics and appearance quality of the composite material 10.

In one or more embodiments of the present invention, the first mold element is the upper mold element 210 and the second mold element is the lower mold element 220. When suctioning the gas from the outer peripheral region 260, the gas is suctioned through the exhaust port 230 which is provided in the upper mold element 210 and on the upper side of the outer peripheral region 260. In the state in which the mold 200 is clamped, the volume of the outer peripheral region 260 is larger than the volume of the resin 12 to be injected into the cavity 250. Accordingly, even if the resin 12 leaks into the outer peripheral region 260 after the mold 200 is clamped, the resin 12 can be prevented from flowing into the exhaust port 230.

In one or more embodiments of the present invention, the upper mold element 210 has the concave part 211 with a shape recessed toward the upper side, and the lower mold element 220 has the convex part 221 which forms the cavity 250 together with the concave part 211. This allows the resin 12 to readily spread through and impregnate the entire reinforcing base material 11 by taking advantage of the own weight of the resin 12.

In one or more embodiments of the present invention, the injection port 240 is provided in the upper mold element 210 and the resin is injected into the cavity 250 through the injection port 240. This allows the resin 12 to readily spread through and impregnate the entire reinforcing base material 11 by taking advantage of the own weight of the resin 12. Moreover, as compared with a case in which the injection port 240 is provided in the lower mold element 220, the position at which the injection port 240 is provided is not limited depending on the shape of the molded product, and an optimal position of the injection port 240 can therefore be set for impregnating the reinforcing base material 11 with the resin 12. As a result, the injection time for the resin 12 can be shortened to reduce the overall cycle time.

In one or more embodiments of the present invention, a material having a softening point Tsp equal to or higher than the molding temperature or the temperature of the first mold element (upper mold element 210) or second mold element (lower mold element 220), such as a thermoset epoxy resin, is used as the binder resin 113 of the reinforcing base material 11 thereby to suppress the fiber misalignment due to the fingering phenomenon which may occur at the time of injection of the resin 12. This can suppress the deterioration of the tensile strength and compressive strength.

The method for molding a composite material and the device for molding a composite material have been heretofore described through one or more embodiments of the present invention, but the present invention is not limited to the features described in the embodiments and may be modified as appropriate based on the recitation of the scope of claims.

For example, the shapes of the mold elements 210 and 220 which form the cavity are not limited to those described in the embodiments. In an alternative embodiment, for example, the first mold element (upper mold element) 210 may be in a form having a convex part, and the second mold element (lower mold element) 220 may be in a form having a concave part corresponding to the convex part. In another embodiment, both the first mold element (upper mold element) 210 and the second mold element (lower mold element) 220 may be in a form having a concave part. In still another embodiment, a flat cavity 250 with no concave and convex parts may be employed.

In the above-described embodiments, the first sealing member 310 and the second sealing member 320 are provided on the first mold element (upper mold element) 210, but the first sealing member 310 and the second sealing member 320 may be provided on the second mold element (lower mold element) 220, or one of the first sealing member 310 and the second sealing member 320 may be provided on the first mold element (upper mold element) 210 and the other may be provide on the second mold element (lower mold element) 220. In the above embodiments, the first sealing member 310 and the second sealing member 320 are disposed on the surfaces among surfaces at which the first mold element 210 and the second mold element 220 face each other. Those surfaces are surfaces along the clamping direction in which the first mold element 210 and the second mold element 220 come relatively close to each other. However, the present invention is not limited to this configuration, and the first sealing member 310 and the second sealing member 320 may be disposed on contact surfaces (mating surfaces) that come into contact with each other as the first mold element 210 and the second mold element 220 come close to each other.

DESCRIPTION OF REFERENCE NUMERALS

10 Composite material
11 Reinforcing base material
111 Woven fabric sheet
112 Fiber base material
113 Binder resin
M1, M2 Hot press mold
12 Resin
100 Molding device
200 Mold
210 Upper mold element (first mold element)
220 Lower mold element (second mold element)
230 Exhaust port
240 Injection port
250 Cavity
260 Outer peripheral region
270 Seal region
310 First sealing member
320 Second sealing member
400 Evacuation unit
500 Resin injection unit
600 Control unit

The invention claimed is:

1. A method for molding a composite material, comprising:
disposing a reinforcing base material in a cavity of a mold comprising a first mold element and a second mold element, the second mold element forming the cavity together with the first mold element;
making the first mold element come relatively close to the second mold element to air-tightly seal a seal region by a first sealing member, the seal region including the cavity and an outer peripheral region, the outer peripheral region communicating with an outer periphery of the cavity;
starting an operation of suctioning a gas from the outer peripheral region to evacuate the gas in the seal region; and thereafter
injecting a resin into a part of the cavity; and thereafter
making the first mold element further come relatively close to the second mold element to clamp the mold and provide a liquid-tight seal between the cavity and the outer peripheral region by a second sealing member while pressing the resin to fill the cavity with the resin; and thereafter
stopping the operation of suctioning the gas from the outer peripheral region,
wherein the first sealing member and the second sealing member are disposed on respective surfaces extending vertically along a clamping direction among surfaces at which the first mold element and the second mold element face each other, the first sealing member is disposed higher than the second sealing member on the surface extending vertically, wherein the clamping direction is a direction in which the first mold element and the second mold element come relatively close to each other,
wherein an uppermost surface of the second mold element directly contacts the first mold element in a state in which the mold is clamped.

2. The method for molding a composite material according to claim 1, wherein
the first mold element is an upper mold element,
the second mold element is a lower mold element,
when suctioning the gas from the outer peripheral region, the gas is suctioned via an exhaust port of the upper mold element provided on an upper side of the outer peripheral region, and
in a state in which the mold is clamped, a volume of the outer peripheral region is larger than a volume of the resin to be injected into the cavity.

3. The method for molding a composite material according to claim 2, wherein
the upper mold element has a concave part with a shape recessed toward an upper side, and
the lower mold element has a convex part forming the cavity together with the concave part.

4. The method for molding a composite material according to claim 2, wherein when injecting the resin into a part of the cavity, the resin is injected via an injection port provided in the upper mold element.

5. The method for molding a composite material according to claim 1, wherein
the reinforcing base material is formed through applying a binder resin to a fiber base material and then curing the binder resin, and
the binder resin has a resin softening point equal to or higher than a temperature of the mold.

6. The method for molding a composite material according to claim 5, wherein the binder resin is a thermoset epoxy resin.

* * * * *